May 6, 1958     J. G. JOACHIM ET AL     2,833,536
POWER OPERATED REAR COMPARTMENT ACTUATOR AND LOCK ASSEMBLY
Filed Nov. 13, 1956     6 Sheets-Sheet 1
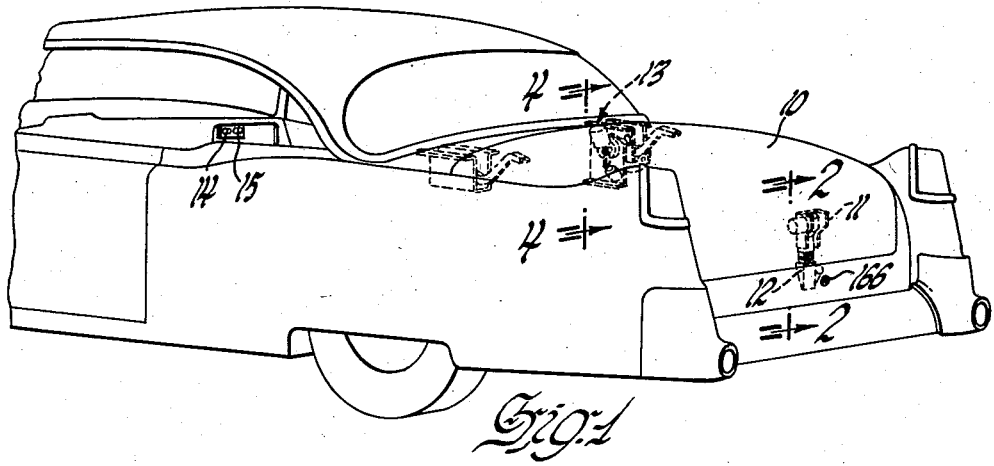
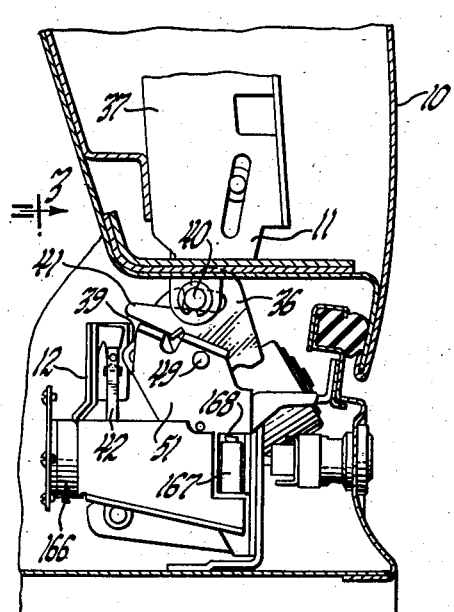
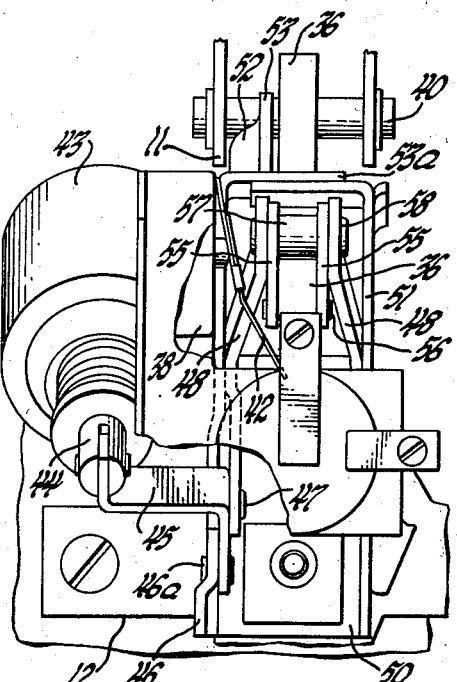
INVENTORS
Joseph George Joachim &
BY Alfred Bruce Sauer
W. C. Middleton
ATTORNEY

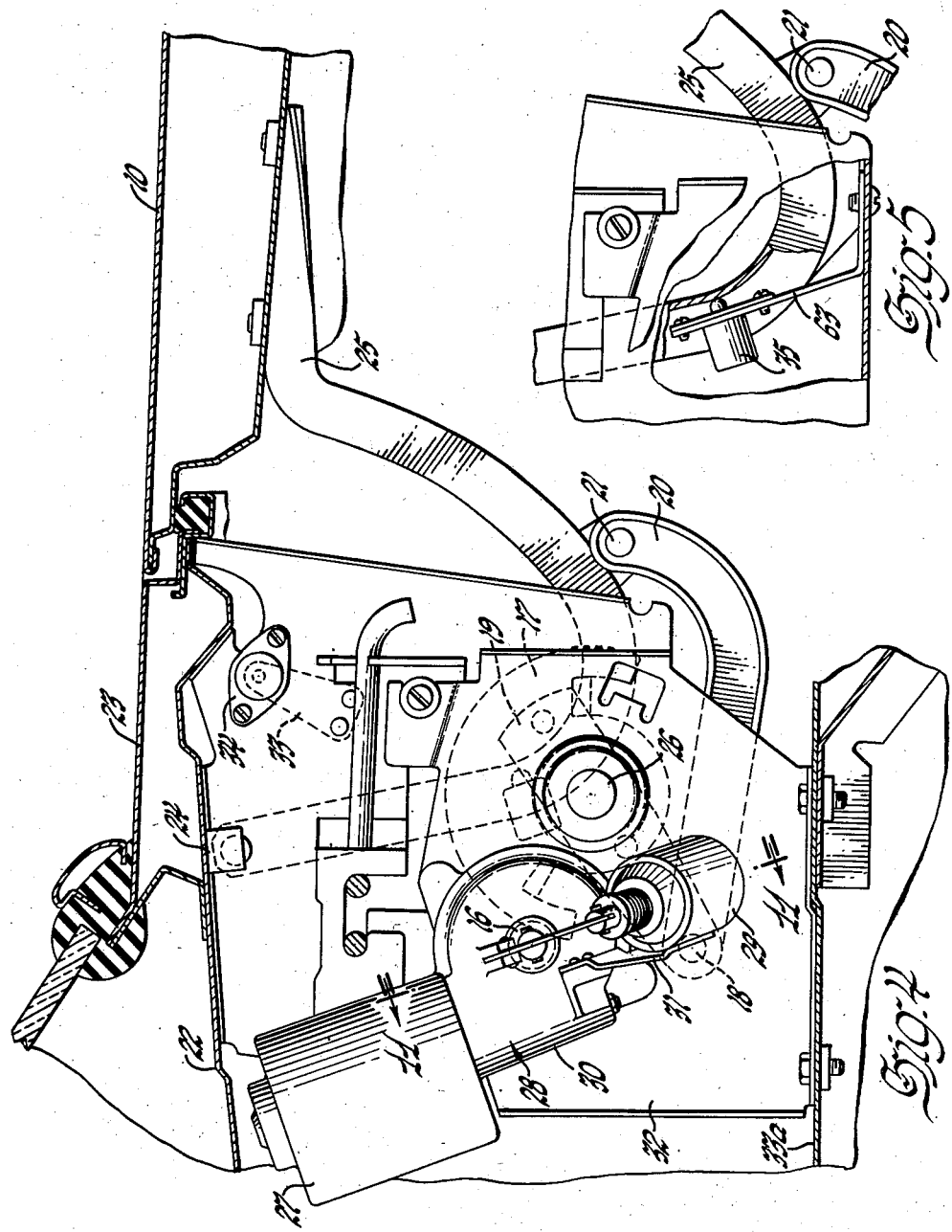

May 6, 1958 J. G. JOACHIM ET AL 2,833,536
POWER OPERATED REAR COMPARTMENT ACTUATOR AND LOCK ASSEMBLY
Filed Nov. 13, 1956 6 Sheets-Sheet 4

INVENTORS
Joseph George Joachim &
BY Alfred Bruce Sauer
W. C. Middleton
ATTORNEY

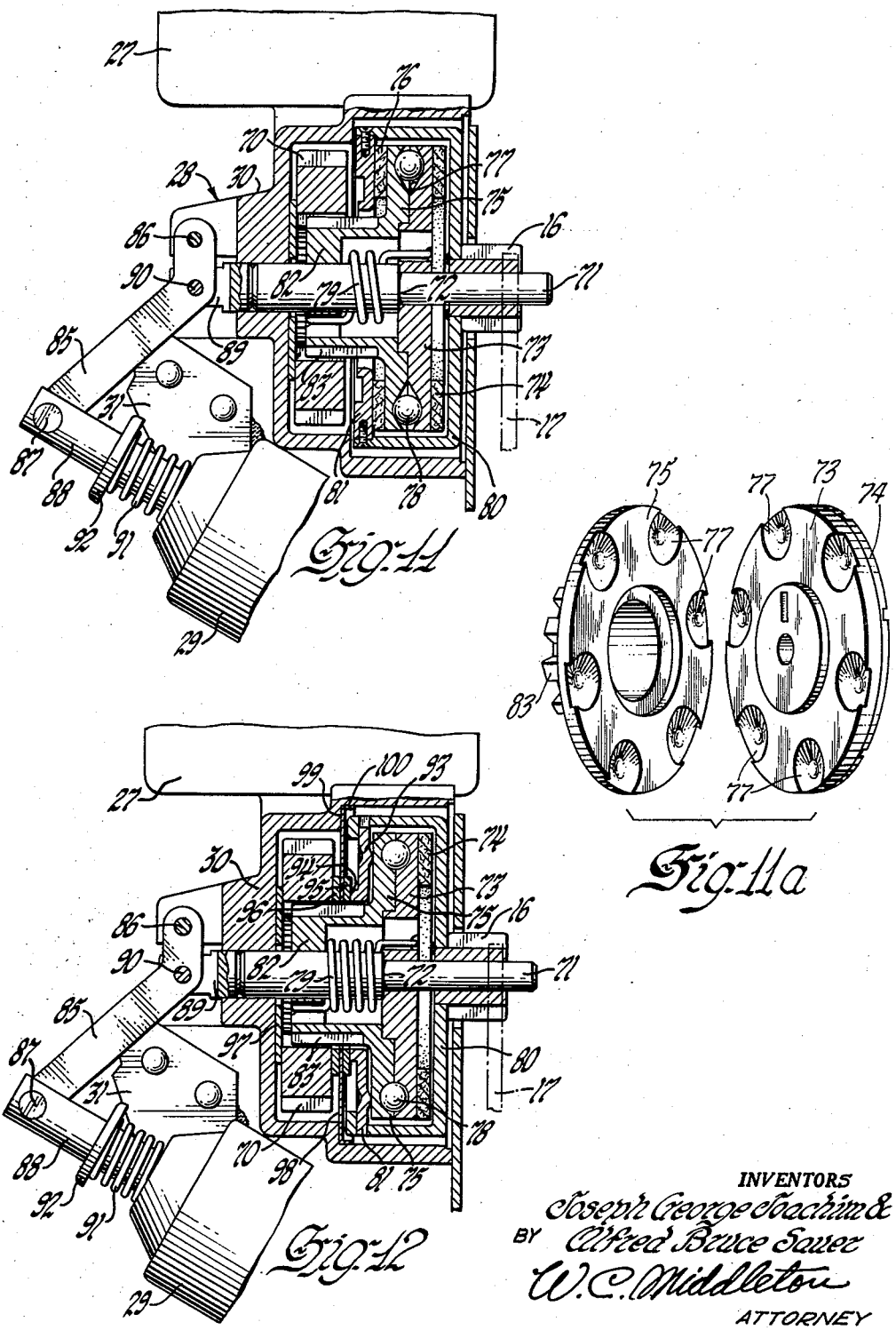

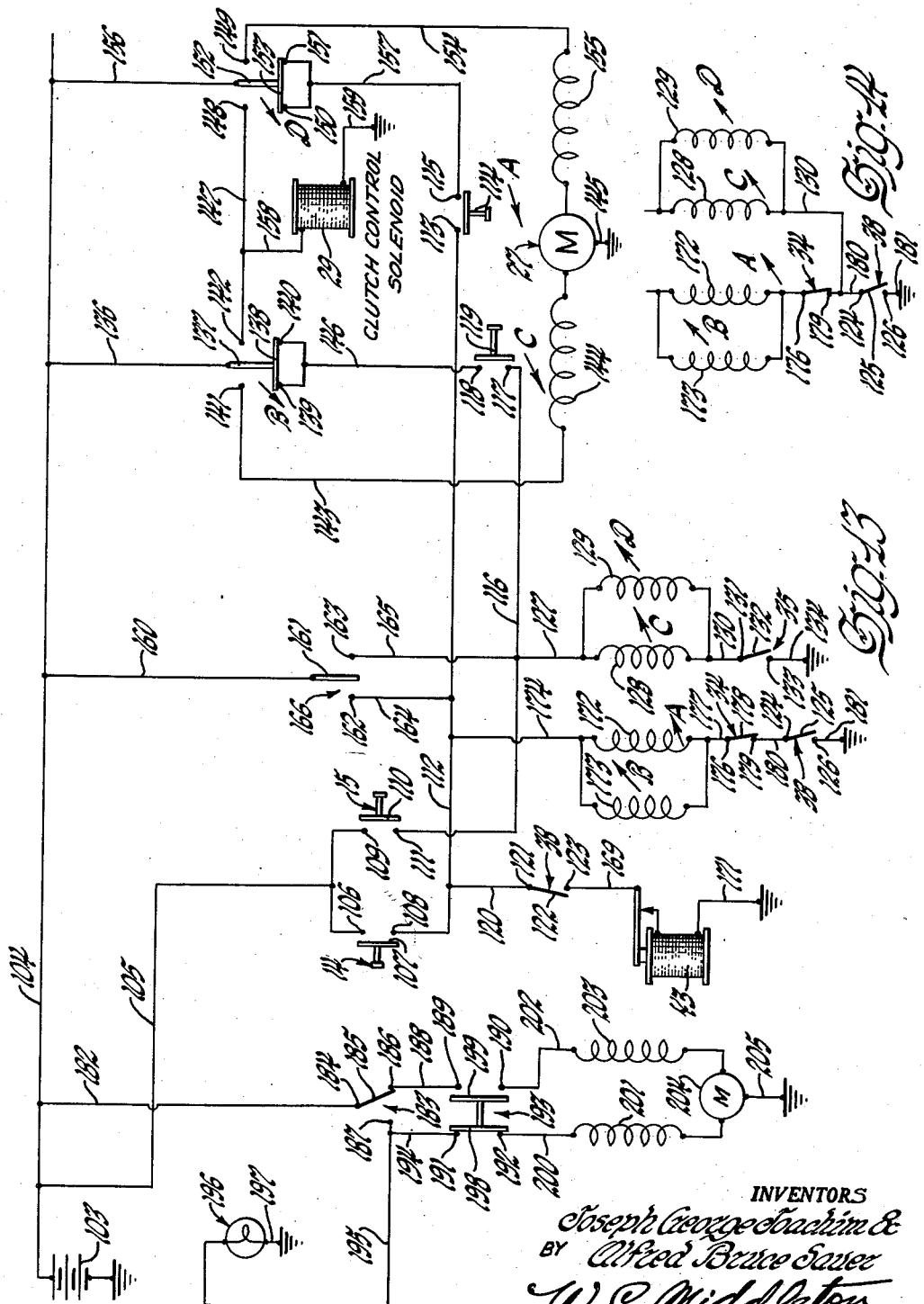

United States Patent Office 2,833,536
Patented May 6, 1958

2,833,536

POWER OPERATED REAR COMPARTMENT ACTUATOR AND LOCK ASSEMBLY

Joseph G. Joachim, Detroit, and Alfred B. Sauer, Farmington, Mich., assignors to General Motors Corporation, Detroit, Mich., a corporation of Delaware Application November 13, 1956, Serial No. 621,723

17 Claims. (Cl. 268—74)

This invention relates to closure members for automotive vehicles and more particularly to a closure member which may be controlled from within the vehicle for power operation between open and closed positions.

An object of this invention is to provide a closure member for a vehicle body adapted to be controlled from within the vehicle and constructed and arranged to be movable by power operated means from a fully closed position to a fully open position and to be moved under power from the fully open position to the fully closed position at the selection of the vehicle operator and without requiring the operator to leave the vehicle to control such power operation.

Another object of this invention is to provide a power operated closure member of the type described which may be controlled for power operation between a fully closed position and a fully open position either from within the vehicle or from the exterior of the vehicle at the selection of the operator.

An additional object of this invention is to provide a power operated closure member of the type described which may be controlled for power operation between a fully closed position and a fully open position either from within the vehicle or from the exterior of the vehicle and incorporating means permitting manual opening and closing of the closure member when desired.

A further object of this invention is to provide a power operated closure member of the type described which may be controlled for power operation between fully closed and open positions in either direction either from within the vehicle or from the exterior of the vehicle and including a novel clutch in the drive train for such power operation arranged to accommodate manual opening and closing of the closure member in the event of power failure.

Another object of this invention is to provide in a control system for a power operated closure member of the type described and having a first power operated mechanism for providing limited initial opening movement of said closure member to a partially open position and second power operated mechanism for moving said closure member between said initial partially opened position and a fully opened position, means automatically operable to cut off power to said second power operated means when said closure member approaches said fully open position together with means automatically operable to cut off power to said second power operated mechanism when said closure member approaches said initial partially open position from its fully open position.

An additional object of this invention is to provide in a control system for a power operated closure member having a latch bolt movable between latched and unlatched positions and having a power operated extendible and retractable striker mechanism for providing initial power operation of said closure member between a fully closed and partially open position in either direction, and second power operated mechanism for providing movement of said closure member between the partially open and fully open positions, switch means controlled by the latch bolt for preventing power operation of the second-mentioned power operated mechanism until the latch bolt is moved to its released position.

These and other objects of this invention will be apparent from the following description and claims taken in conjunction with the accompanying drawings in which:

Figure 1 is a partial view of a vehicle embodying power operated mechanism for opening and closing a closure member in accordance with this invention.

Figure 2 is a partial side elevational view showing portions of the latch bolt and power operated striker member in the latched position.

Figure 3 is an elevational view of the latch bolt assembly taken along the line 3—3 of Figure 2.

Figure 4 is a side elevational view showing the relationship of the closure member, drive motor, clutch unit, and power operated opening and closing mechanism with the closure member in its fully closed position.

Figure 5 is a side elevational view of a limit switch and closure member actuator strap illustrating the relationship of the limit switch and actuator strap when the closure member is in its closed position.

Figure 11 is a sectional view of the clutch taken along the line 11—11 of Figure 4.

Figure 12 is a sectional view of a modified clutch structure.

Figure 13 is a circuit diagram for the control circuit of this invention.

Figure 14 is a modification of one portion of the circuit diagram illustrated in Figure 13.

Figure 6:
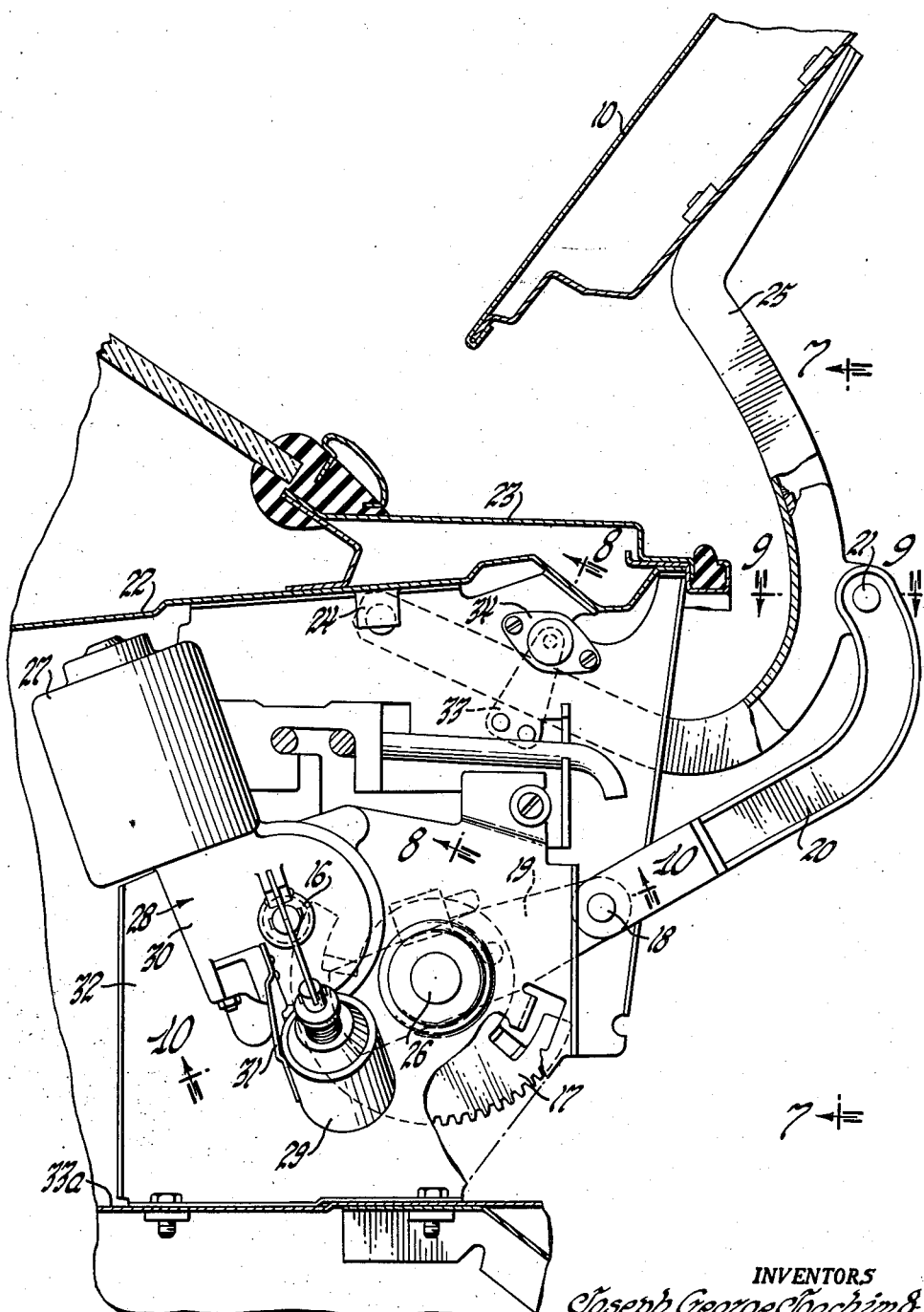
Figure 6 is a side elevational view illustrating the parts of Figure 4 with the closure member in its fully open position.

Referring to Figure 1, there is shown an automotive vehicle having a closure member or deck lid 10 which may be power operated to move from its closed position to a fully open position and may be controlled either from within the vehicle or from the exterior of the vehicle at the election of the vehicle driver. The lock mechanism for closure member 10 includes an extendible and retractable power operated striker mechanism indicated at 11 and a latch mechanism indicated at 12. The function of the striker mechanism 11 is to provide movement of the closure member 10 under power from a fully closed position to an initial partially opened position and vice versa. The closure member 10 may be moved under power from its initial partially opened position to its fully opened position by means of a power driven assembly indicated generally at 13. The latch and power driven striker may be of the type fully described in the co-pending application for United States Letters Patent of Louis P. Garvey and Clyde H. Schamel, Serial Number 557,713 filed January 6, 1956. Switch means for controlling the power operated striker 11 and the power assembly 13 are positioned within the vehicle for easy access by the vehicle driver. The switches are illustrated as being two separate switches 14 and 15, the switch 14 being for the purpose of initiating opening movement of deck lid closure member 10 under power, and switch 15 being for the purpose of initating closing motion of the closure member 10 under power. It will be understood that a single switch mechanism having two sets of contacts could be substituted for the separate switches 14 and 15 of Figure 1. A key operated switch is indicated generally at 166 in Figure 1, the switch 166 being operable to initiate and control movement of deck lid 10 in either an opening or closing direction and accessible from the exterior of the vehicle. The key operated switch may be of the type disclosed in the afore-identified copending application of Louis P. Garvey et al.

Referring to Figures 4 and 6, there is shown a closure member or deck lid 10 fixed to a deck lid actuating strap 25, the strap 25 being hinged to pivot about a support bracket 24 fixed to the vehicle body 23 by a support plate 22. Pivotally connected to the lid actuator strap 25 by means of a pivot pin 21 is connecting link 20, the link 20 in turn being pivotally connected to a lid actuator lift arm 19 by means of a pivot pin 18. A sector gear 17 meshing with a drive gear 16 is rigidly fixed to lift arm 19 so that the sector gear and lift arm rotate as a unit about a support shaft 26. Drive gear 16 and sector gear 17 are driven by a motor and clutch assembly, the motor being indicated at 27 and the clutch unit at 28. A clutch actuator solenoid 29 is supported upon a clutch housing 30 by means of a bracket 31. The motor and clutch assembly are supported upon a bracket plate 32, the bracket 32 being fixed to the vehicle body indicated at 33A.

In Figure 6, the deck lid 10 is illustrated in its fully open position. In this position, the deck lid actuator strap 25 is shown as contacting an upward travel limit switch actuator spring 33 so that a limit switch 34 will be open when the deck lid is raised under power to its fully opened position. Limit switch 34, therefore, automatically cuts off drive motor 27 upon movement of deck lid 10 to its fully open position. In Figure 4, the deck lid 10 is illustrated as being fully closed.

Figure 5 shows a lower travel limit switch 35 which is opened by lid actuating strap 25 to cut off power from motor 27 of Figs. 4 and 6 when the deck lid is moved under power in a closing direction and assumes a position wherein a power operated expandable and retractable striker mechanism is conditioned to complete the closing motion of the deck lid as hereafter more fully explained. Thus, upward travel and downward travel limit switches 34 and 35, which may be of standard construction, are controlled by the deck lid actuating strap 25 to deenergize motor 27 in either extreme position of the range of operation under power as supplied by motor 27.

As shown in Figure 2, deck lid 10 is provided with a latch bolt 36 and a power operated extendible and retractable striker mechanism 37 of the type shown in the heretofore identified co-pending application of Louis P. Garvey et al. which includes means for unlocking the latch bolt either electrically or mechanically. The latch and power operated striker do not constitute a part of this invention except in combination with the power operated deck lid opening and closing mechanism. They are, therefore, not described in detail in the present specification, reference being had to the previously identified co-pending application of Louis P. Garvey et al. for full details of these mechanisms. In Figure 2, the power operated extendible and retractable striker mechanism 37 is shown as being mounted on the deck lid closure member 10 and the latch mechanism 36 mounted on the vehicle body, whereas in the co-pending application of Louis P. Garvey et al., above identified, the reverse was true. An additional feature in this disclosure is the provision of a timing switch 38 (see Fig. 3) operated by a member 39 (see Fig. 2) connected to latch bolt 36 and adapted to move out of contact with a switch actuating spring 42 (see Fig. 2) so that no power may be applied to the power operated lid actuator strap 25 of Figure 4 until after the latch bolt 36 is released. More specifically, when switch 14 of Figure 1 is turned to open the deck lid, switch 38 of Figure 3 will prevent motor 27 of Figures 4 and 6 from being energized until the power means (not shown) for releasing the latch 36 and extending the striker 37 of Figure 2 have first been energized to release the latch and cause the closure member 10 to move to an initial partially open position. The means for releasing the latch bolt 36 electrically is a solenoid, while the means for operating the extendible and retractable striker is a motor having separate windings individually adapted to be energized to move the striker 37 to cause limited initial opening movement or to complete the closing motion of deck lid 10. The latch release solenoid is indicated at 43 in Figure 13. The motor windings 201 and 203 of motor 204 for extending and retracting striker 37 are shown in Figure 13. The function of switch 38 is to prevent motor 27 from being energized when latch bolt 36 is closed. After the striker mechanism 37 has raised the closure 10 a limited extent, switch 38 will close to permit motor 27 to raise closure 10 to its fully open position. Switch 38 is provided with two movable contacts 122 and 125 shown in Figure 13 for the purpose as hereafter more fully explained. To close the deck lid 10, switch 15 of Figure 1 is closed to energize motor 27 of Figures 4 and 6, thereby closing the deck lid under power. Motor 27 is provided with two coils 144 and 155 (see Fig. 13), to provide two opposite directions of rotation, depending upon which winding is energized. In its closing action, when the deck lid is partially closed, the striker bar 40 of power operated extendible and retractable striker 37 (see Fig. 2) contacts finger 41 of latch bolt 36, thereby tripping latch bolt 36 to its locked position and causing member 39 of latch 36 to contact spring actuating arm 42 of switch 38 to open a set of contacts 124—125—126 of switch 38 (see Fig. 13). This cuts off power to the motor 27 of Figs. 4 and 6 so that the motor will not fully close the deck lid. The final closing motion of the deck lid is accomplished through operation of the power operated extendible and retractable striker mechanism 37 as fully disclosed in the heretofore identified co-pending application Serial Number 557,713. When the deck lid is fully closed, the power to the striker mechanism motor indicated at 204 in Fig. 13 is automatically cut off as disclosed in the above-identified co-pending application of Louis P. Garvey et al. The switch for cutting off power to the striker motor 204 of Fig. 13 is shown at 183 in Fig. 13.

To open the deck lid, switch 14 of Figure 1 is operated to energize the latch bolt release solenoid 43 of Figure 3. Solenoid 43 is provided with an armature 44 connected to an arm 45, the arm 45 being pivotally supported upon a fixed mounting bracket 46 at 46A. Arm 45 is pivotally connected to a yoke member 48 at 47. Latch bolt 36 is pivotally supported upon a bolt 49 (see Fig. 2) extending between the upstanding side walls 51 of a support bracket 50. A guard 52 having an offset leg 53 is also rotatably mounted on pin 49. The lower edge of guard leg 53 bears against an end portion 53A of upstanding wall 51 of support bracket 50. A pair of links 55 have one end pivotally secured to the latch bolt 36 by a pin 56. The other end of each link is rotatably mounted upon a bushing 57 rotatably supported by a pin 58.

By energizing the latch solenoid 43 of Fig. 3 through operation of switch 14 of Fig. 1, the latch is released. When energized, armature 44 is drawn into the solenoid casing, thereby causing arm 45 to pivot about point 46A and the yoke 48 to be moved in an arc and rotated slightly about pivot point 47 as arm 45 is pivoted about point 46A. Motion of yoke 48 about point 47 results in motion of pin 58 and bushing 57 together with motion of links 55 and pin 56, causing rotation of latch bolt 36 about its pivot point 49 to release the latch 36 from striker bolt 40 of Fig. 2. Upon release of the latch 36, a set of contacts 124—125—126 of switch 38 (see Fig.

13) close to energize the deck lid operating motor 27 to move the deck lid 10 under power.

Figure 7:
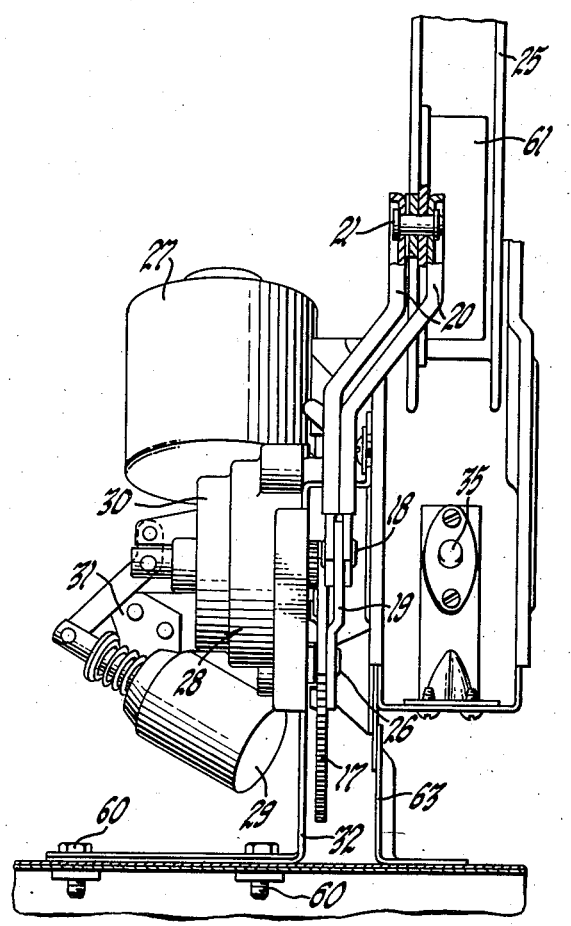
Figure 7 is an end view taken along the line 7—7 of Figure 6.
Figure 9:
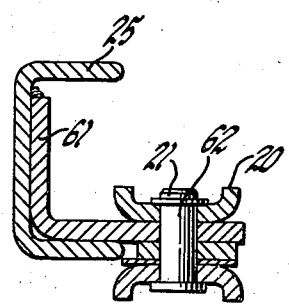
Figure 9 is a partially sectional view taken along the line 9—9 of Figure 6.
Figure 10:
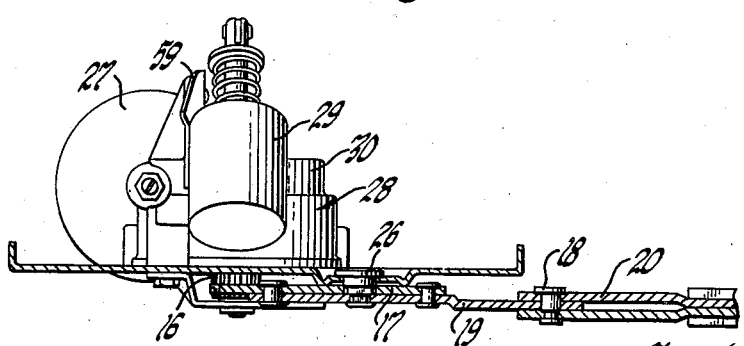
Figure 10 is a sectional view taken along the line 10—10 of Figure 6.

In Figures 7 and 10, the arrangement of the deck lid power drive mechanism is further shown. The mounting plate 32 is secured to the vehicle body by bolts 60. Clutch housing 30, deck lid motor 27, and clutch control solenoid 29 are supported upon plate 32 in any suitable manner as shown, the clutch housing 30 is carried by plate 32, the clutch solenoid 29, being in turn supported upon clutch housing 30 by means of a support bracket 31. Sector gear 17 and lid actuator lift arm 19, fixed to sector gear 17 are supported upon a pin 26 for rotation about the pin 26. Drive gear 16, which meshes with sector gear 17 is driven by motor 27 through clutch unit 28 to cause rotation of sector gear 17 and lift arm 19 about pin 26. Connecting link 20 is pivotally connected to lift arm 19 at 18 and pivotally connected to lid actuator strap 25 at 21. In Figures 7 and 9, there is shown an ear 61 welded to strap 25, the connecting link 20 being pivotally connected to the lid actuating strap 25 by a bushing 62. In Figures 5 and 7, a support 63 positions lower travel limit switch 35 in the path of travel of lid actuating strap 25 so that switch 35 will be opened when the strap 25 is in the position it assumes when the power actuated striker 37 of Fig. 2 becomes effective to complete the closing action of the deck lid. The switch 35 is a standard microswitch which is spring biased to close its contacts. Thus, when lid actuating strap 25 moves a slight amount toward the deck lid opening position, switch 35 will be closed.

Figure 8:
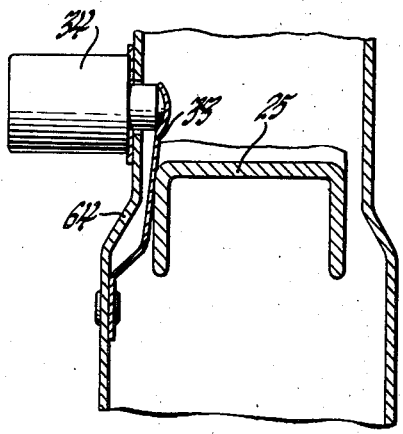
Figure 8 is a partially sectional view taken along the line 8—8 of Figure 6.

In Figure 8 the upward travel limit switch 34 is shown in its open contact position, the switch 34 being secured to a support plate 64 and opened through operation of a switch actuator leaf spring 33, which is contacted by lid actuator strap 25 when the deck lid is in its fully open position. In the fully open position of the deck lid, switch 34 will be open. In all other positions of the deck lid, switch 34 will be closed. Leaf spring 33 moves outwardly into the path of travel of actuator strap 25 to permit switch 34 to close whenever the actuator strap 25 is not in the position shown in Figure 8, which represents the upward permissible limit of travel of actuator strap 25.

In Figure 11, there is shown a clutch unit 28 interposed in the drive train for the deck lid power drive. The clutch permits the deck lid to be opened and closed manually in the event of power failure, and serves to connect motor 27 to drive gear 16 for power operation. Drive motor 27, supported upon clutch housing 30, is adapted to drive a gear 70 through suitable mechanism, not shown, whenever the motor 27 is energized. A shaft 71 is slidably and rotatably mounted within housing 30 and includes a shoulder 72. A clutch actuating plate 73 is slidably and rotatably mounted upon shaft 71 in engagement with shoulder 72 and mounts a clutch facing 74 which is a circular ring of friction material. A clutch energizing plate 75 is also slidably and rotatably mounted upon shaft 71 and mounts a clutch facing ring 76. The adjacent surfaces of plates 73 and 75 are provided with a plurality of ball ramps 77 of conical shape, there being a ball 78 disposed between the clutch facings in each of the ramps. A coiled torsion and tension spring 79 has one end thereof secured to the hub of the clutch energizing plate 75 and the other end thereof secured to the hub of the clutch actuating plate 73. The spring acts as a clutch return spring, its function being to hold the clutch plates in engagement with each other and to align the ramps 77 such that the clutch energizing balls 78 seat within the ramps when the clutch solenoid is not energized.

A cup shaped rotatable clutch drum 80 surrounds the clutch plates and has a clutch reaction member 81 and pinion gear 16 affixed thereto. Shaft 71 extends through gear 16 and is slidable and rotatable with respect to drive gear 16. Clutch energizer plate 75 is provided with a hub 82 having external splines 83 thereon adapted to be driven by gear 70 splined thereto, the gear 70 being driven by motor 27 through suitable drive mechanism such as a worm wheel (not shown). Pinion gear 16, fixed to clutch drum 80, drives sector gear 17.

A bell crank lever 85 pivoted at 86 on the clutch housing 30 is pivotally connected at 87 to an armature 88 of clutch control solenoid 29. Solenoid 29 is welded or otherwise secured to a bracket 31, which in turn is fastened to clutch housing 30. An actuating rod 89, which is slidable with respect to housing 30, is pivotally connected to bell crank lever 85 by a pin 90. Actuating rod 89 bears against one end of shaft 71.

In Figure 12, there is shown a clutch structure generally similar to that of Figure 11, the corresponding parts carrying the same number as similar parts of Fig. 11, but modified to provide an improved oil and dirt seal over the embodiment shown in Figure 11. In the Figure 12 embodiment, only a single clutch facing 74 carried by clutch actuating plate 73 is provided. Reaction plate 81, carried by the rotatable clutch housing 80 is provided with a struck up ring 93 adapted to contact the energizing place 75 at the side opposite the plate from clutch energizing balls 78. Reaction plate 81 is provided with an annular ring 94 at the hub thereof to contact a washer 95. A second washer 96 contacts the base of gear 70 at one side thereof, and a thrust washer 97 is disposed between the other side of gear 70 and clutch housing 30. An annular grease seal 98 is disposed between washers 94 and 96 and at its outer circumference contacts housing 30 at 99. Seal 98 is bent over at its outer circumference to provide a lip 100 which also contacts housing 30. When the clutch is engaged, lip 94 of reaction plate 81 forces washer 95 against the base of seal 98 to provide a leak proof seal at the base of seal 98. The seal contact at the outer circumference of seal 98 is provided both between the side wall of the radially extending seal and the housing and between lip 100 and the housing. In both Figs. 11 and 12 a spring 91 acts upon a flange 92 fixed to armature 88 to move bell crank lever 85 to its clutch release position whenever the solenoid is deenergized.

*Clutch operation*

When it is desired to rotate drive pinion gear 16 so as to turn sector gear 17, solenoid 29 is energized to retract armature 88 against spring 91 and serving bell crank lever 85 about pivot 86. This will cause actuating rod 89 to shift shaft 71 inwardly within housing 30. Due to the engagement of shoulder 72 of shaft 71 with clutch actuating plate 73, clutch facing 74 will engage rotatable clutch drum 80. Simultaneously with this shifting movement of shaft 71, motor 27 is energized to rotate the clutch energizing plate 75 about the shaft 71. Since the clutch actuating plate 73 is initially held stationary against housing 80, the clutch energizing plate 75 will rotate relative to the clutch actuating plate 73 so that the clutch energizing balls 78 will ride up the conical ramps 77 and shift the clutch energizing plate 75 axially so that the clutch facing 76 of the plate will firmly engage the clutch reaction plate 81. Thus, clutch energizing balls 78 move the clutch energizing plate 75 axially of the clutch actuating plate 73 and thereby impart rotary motion to housing 80 through clutch reaction plate 81. As housing 80 rotates, pinion gear 16 fixed to housing 80 will drive sector gear 17 to move the deck lid between open and closed positions through arm 19 secured to gear 17 for rotation therewith, link 20, and lid actuator 25.

The motor and clutch unit heretofore described are connected into an electrical circuit which controls the operation of the deck lid power lift assembly and the extendible and retractable striker assembly so that each of these units will operate in a predetermined sequence. Assuming that the deck lid is initially closed, and the vehicle operator wishes to open the deck lid, switch 14 of Figure 1 is momentarily closed to operate the latch solenoid 43 to release the latch bolt 36 from striker bar 40. Release of the latch permits the timing switch 38 operated by latch member 39 of Figure 2 to close, thereby providing a ground for the deck lid actuator motor circuit so that the motor and clutch solenoid may be energized. When deck lid is fully opened, the upward travel limit switch controlled by the lid actuator arm is opened to stop motor 27. To close the deck lid, switch 15 is momentarily closed, thereby causing motor 27 to move the deck lid toward its closed position. As the lock mechanism for the deck lid moves toward its locked position, timing switch 38 is opened, thereby cutting off power to the deck lid motor 27. Completion of the locking action is accomplished by the motor operated striker mechanism. When the locking action is completed, a micro-switch controlled by the striker mechanism cuts off power to the striker motor as taught in our heretofore identified co-pending application.

Referring to Figure 13, there is shown a schematic diagram of an electrical circuit used to control the operation of the deck lid. A conductor 105 extends from a conductor 104, connected to a battery 103, to a contact 106 of switch 14 and to a contact 109 of switch 15. The switches 14 and 15 are positioned in the vehicle as shown in Figure 1. Switch 14 is used to open the deck lid, and switch 15 is used to close the deck lid. Switch 14 is provided with contacts 106, 107, and 108, while switch 15 is provided with contacts 109, 110, and 111. A conductor 112 extends from a contact 108 of switch 14 to a contact 113 of a switch relay A having contacts 113, 114, and 115, the contacts being normally open. A conductor 116 extends from contact 111 of switch 15 to a contact 117 of a relay C provided with contacts 117, 118, and 119, the contacts being normally open. A conductor 120 extends from conductor 112 to a contact 121 of timing switch 38 having contacts 121, 122, and 123, which are normally closed. Timing switch 38 is also provided with contacts 124, 125, and 126, which are normally open. The normally closed contacts 121, 122, and 123, of timing switch 38 are closed when the latch bolt 36 is in the latched position and opened when the latch bolt 36 is in unlatched position. The normally open contacts 124, 125, and 126 are open when the latch bolt 36 is in the latched position and closed when the latch bolt 36 is in the unlatched position. A conductor 127 extends from conductor 116 to relay coils 128 and 129 of relays C and D which are in parallel connection with each other, while a conductor 130 connects the coils 128 and 129 to a contact 131 of downward travel limit switch 35, having contacts 131, 132, and 133. The contacts of limit switch 35 are closed in all positions of the deck lid except for its fully closed position. Switch 35 is ground through a conductor 134.

As heretofore explained, downward travel limit switch 35 is contacted by hinge arm 25 to open contacts 132, 133.

A conductor 136 extends from conductor 104 to an armature 137 of a relay B. Armature 137 carried a contact 138 adapted to alternately close either contacts 139, 140 of contacts 141, 142 of a relay B. Contacts 141, 142 are normally open, while contacts 139, 140 are normally closed. A conductor 143 extends from contact 141 to the winding 144 of the deck lid operating motor 27. Winding 144 causes motor 27 to open the deck lid when energized. Motor 27 is grounded through a conductor 145. A conductor 146 extends from contacts 139, 140 of relay B to contact 118 of relay C. Contacts 139, 140 of relay B are normally closed, while contacts 117, 118 of relay C are normally open. A conductor 147 extends from contact 142 of switch relay B to a contact 148 of a relay D having contacts 148, 149, 150 and 151, and an armature 152 carrying a contact 153. Contacts 148 and 149 of relay D are normally open, while contacts 150 and 151 are normally closed by contact 153. A conductor 154 extends from contact 149 of relay D to the winding 155 of motor 27. Winding 155 is energized to cause motor 27 to close the deck lid. Relay B is the power relay used to cause motor 27 to rotate in one direction to open the deck lid, while relay D is the power relay used to cause motor 27 to rotate in the opposite direction to close the deck lid. Winding 155, when energized, causes motor 27 to rotate in the opposite direction than that which occurs when motor winding 144 is energized. A conductor 156 extends from conductor 104 to armature 152 of relay D, the contact 153 being adapted to close either contacts 148, 149 or 150, 151. A conductor 157 connects contacts 150, 151 of relay D to contact 115 of relay A. A conductor 158 extends from conductor 147 to clutch solenoid 29 which actuates the clutch 28 for the deck lid power unit. Solenoid 29 is grounded through a conductor 159. Whenever either coil 144 or 155 of motor 27 is energized, clutch solenoid 29 is also energized to engage the clutch.

A conductor 160 extends from conductor 104 to a switch member 161 of key operated cylinder switch 166. Contact 161 is adapted to engage either a contact 162 or a contact 163. Contact 162 is connected to conductor 112 by means of a conductor 164. Contact 163 is connected to conductor 116 through a conductor 165. The key operated cylinder switch 166 is shown in Figures 2 and 13 and is a rotary switch. When contacts 161, 162 are closed by rotation of the key operated cylinder switch 166 and the latch bolt is released, the motor 27 and motor clutch armature 29 are energized to open the deck lid. When contacts 161, 163 are closed by operation of the key cylinder switch, the motor 27 and clutch armature 29 are energized to close the deck lid. The electrical circuit functions in the same manner as that heretofore described in connection with the operation of switch 14 to open the trunk lid and switch 15 to close the trunk lid. The remote switches 14 and 15 and the key operated lock switch 166 are in parallel so that the electrical circuit may be controlled either from within or from the exterior of the vehicle for power operation of the deck lid. In the event of operation from the rear of the vehicle, the lock is mechanically released through action of a cam 167 and lock member 168 (see Fig. 2) in the same manner as fully described in the previously identified copending application Serial No. 557,713. Contact 123 of the timing switch 38 is connected to a lock release solenoid 43 through a conductor 169, the lock release solenoid 43 being connected to ground through a conductor 171. In the event that switch 14 is closed to open the trunk lid electrically, solenoid 43 is energized to release the trunk lid latch as fully disclosed in our heretofore identified application.

Relay coils 172 and 173 of relays A and B, connected in parallel with each other, are connected to conductor 112 by means of a conductor 174, and are connected to a contact 176 of upward travel limit switch 34 by means of a conductor 177. Limit switch 34 has contacts 176, 178 and 179 which are closed at all times except when the deck lid is fully open. A conductor 180 connects contact 179 of upward travel limit switch 34 to contact 124 of timing switch 38. Contact 126 of timing switch 38 is connected to ground by means of a conductor 181.

At the left of Figure 13 there is shown an electrical circuit for controlling the power operated striker, this portion of the circuit and complete details of the striker being shown in the copending application Serial No. 557,713, the function of this circuit being to control the power operated striker motor to cause the retractable and extendible striker to selectively complete the closing or to initiate the limited opening movement of the deck lid. A conductor 182 extends from conductor 104 to a contact 184 of a microswitch 183 having contacts 184, 185, 186 and 187. The microswitch is mounted upon the extendible and retractable striker mechanism in such manner that contact 185 is movable between contacts 186 and 187 as a result of extension and retraction of the striker member on which it is mounted. A conductor 188 extends from contact 186 to a contact 189 of a double type pressure actuated switch 193 having contacts 189, 190, 191 and 192. Switch 193 is also controlled by the striker mechanism, such that upon completion of the closing function of the striker, switch 193 cuts off power from the striker motor. A conductor 194 extends between contact 187 of switch 183 to contact 191 of switch 193. A conductor 195 connects a signal lamp 196 to conductor 194, the signal lamp 196 being grounded through a conductor 197. Switch 193, which is a pressure operated limit switch for the motor of the striker mechanism, has contact 198 adapted to bridge contacts 191, 192, and 199 adapted to bridge contacts 189 and 190. The striker mechanism motor 204 has one coil 201 thereof connected to contact 192 by means of a conductor 200, and the other coil 203 thereof connected to contact 190 by means of a conductor 202. The motor 204 is grounded through conductor 205. The arrangement is such that an operating plunger of switch 193 positions contact 198 to close contacts 191, 192 when the deck lid is fully closed with the deck lid latch in its locked position with the striker mechanism fully retracted, while contact 199 connects contacts 189, 190 when the deck lid latch assembly is unlocked and the striker mechanism is fully extended. The sets of contacts are alternately closed, but cannot be closed simultaneously. When motor coil 201 is energized, the motor 204 is driven in one direction to cause the extendible and retractable striker mechanism to move toward its extended position. When coil 203 of motor 204 is energized, motor 204 is driven in the opposite direction to cause the striker mechanism to move toward its retracted position.

As has previously been described, the latch bolt 36 may be moved to unlocked position to unlatch deck lid 10 either by solenoid 43 or by cam 167 of the key lock cylinder assembly. In the locked position of the latch bolt, contact 185 of switch 183 engages contact 186 and plunger operated contact 198 closed contacts 191, 192, the contacts 189, 190 then being open so that the motor 204 is deenergized. In the event that the latch bolt is unlocked, latch bolt 36 moves out of contact with the electrical contact 185 and allows the switch contact 185 to be spring biased by springs (not shown) to electrically connect conductor 182 to contact 187. A circuit is then completed through conductor 194 and contacts 191, 192 of switch 193 to the winding 201 of motor 204 to cause the motor to move the striker mechanism toward its extended position while the latch bolt moves to its unlocked position. When the striker mechanism reaches its fully extended position, the switch 193 is moved by the striker mechanism to open contacts 191, 192 and close contacts 189, 190. This breaks the circuit to striker operator motor 204 through conductor 200 and stops the motor. Whenever the circuit is completed to the motor through conductor 194, the light 196, which may be positioned on the instrument panel, is lighted to signal the driver that the deck lid has been opened.

Assuming that the deck lid is partially closed either manually or by action of motor 27, so that the latch bolt 36 is moved to its locked position by reason of its engagement with striker bar 40, switch contact 185 of microswitch 183 is moved by the latch bolt 36 into engagement with contact 186 to connect conductors 182 and 188. Since the contact 199 at this time connects contact 189 to 190, the conductor 202 and motor winding 203 are energized to cause the motor to retract the striker mechanism and striker bar 40. This action pulls the deck lid to its fully closed position. When the deck lid is fully closed, the switch contact 199, which is controlled by the striker mechanism, is moved to open contacts 189 and 190 and close contacts 191, 192. The circuit to motor winding 203 is thereby broken to stop the motor 204. The deck lid latch and striker mechanism is thereby readied for another cycle of operation. From the foregoing, it will be understood that the striker mechanism motor 204 will be actuated regardless of whether the latch bolt is moved to its unlocked position by the key cylinder lock assembly or by solenoid 43. As heretofore explained, the deck lid lock release solenoid 43 is operated to release the deck lid latch before the deck lid operating motor 27 can be energized. This is accomplished through the timing switch 38 heretofore described, the contacts 125, 126 thereof being open when the latch bolt 36 is moved to its unlatched position. Thus, to open the trunk lid, switch contact 107 of switch 14 is closed thereby energizing lock release solenoid 43 to unlatch latch member 36 from striker bolt 40. Movement of the latch member 36 to its unlatched position closes contacts 191 and 192 to energize coil 201, thereby energizing the extendible-retractor striker operating motor to move the striker towards its extended position. When the striker reaches its outer limit of movement, limit switch contacts 189, 190 are bridged by contact 199 and contacts 191, 192 are opened, thereby cutting off power to the striker motor 204. The coil 144 of the deck lid operating motor 27 is energized as soon as the deck lid latch is released; the contact 125 of switch 38 being actuated by the latch bolt to be closed to contact 126 upon release of the latch bolt. This arrangement prevents the deck lid actuating motor from applying power to the deck lid operating mechanism when the deck lid is locked.

Upon completion of the opening of the deck lid 10, the upward travel safety limit switch contacts 178, 179 are opened to cut off power from motor winding 144. Relay coil 173 of relay B, when energized, moves relay contact 138 out of contact with contacts 139, 140 and into contact with contacts 141, 142. When relay coil 173 of relay B is deenergized, the contact 138 bridges contacts 139, 140. Relay coil 172 of relay A, when energized, closes relay contact 114 to contacts 113, 115. When relay coil 172 of relay A is deenergized, the contacts 113, 114 and 115 of relay A are open. Thus, when timing switch contacts 124, 125 and 126 are closed, relay contacts 138, 141 and 142 are closed to energize the motor winding 144 of the deck lid operating motor 27, at the same time, relay contacts 113, 114 and 115 of relay A are closed. Relay coil 128 controls the contacts 117, 118 and 119 of relay C. When coil 128 is deenergized, contacts 117, 118 and 119 of relay C are open. When coil 128 is energized, the contacts 117, 118 and 119 of relay C are closed. Relay coil 129 controls the contacts 148, 149, 150 and 151 of relay D. When coil 129 is deenergized, contacts 150, 151 are bridged by contact 153. When coil 129 is energized, contacts 148 and 149 are bridged by contact 153.

To close the deck lid under power operation, contact 110 of switch 15 is closed across contacts 109, 111, thereby energizing relay coils 128 and 129 to close contacts 117, 118 and 119 and contacts 148, 149 and 153, respectively. This energized motor coil 155 to cause the motor to close the deck lid. As the deck lid lock moves to its locked position, the timing switch contact 125 is opened from contact 126. As the deck lid is closed, the downward travel limit switch contact 132, operated by the deck lid arm 25, is opened to deenergize relay coils 128 and 129. Relay contacts 148, 149 and 153 are opened to cut off power to motor coil 155 and contacts 150, 151 and 153 are closed. Completion of the closing of the deck lid is accomplished through the expandible and retractable striker mechanism and the controls heretofore described. It will be noted that whenever contacts 138, 141 and 142 of relay B or contacts 148, 149 and 153 of relay D are closed, the clutch solenoid 29 of the deck lid power unit is energized to engage the clutch. Thus, for power operation of the deck lid either towards its open or closed position, solenoid 29 is energized. However, in the event of power failure, the clutch solenoid will be deenergized so that the clutch is disengaged. The operator may then unlock the trunk lid by use of the key and open and close the trunk lid manually.

The deck lid may also be opened and closed by key operation under power by alternately turning the key to close contacts 161, 162 and 161, 163. Closure of switch contacts 161, 162 of key operated switch 166 energizes the circuit in the same manner as closing of contacts 106, 108 and 107 of switch 14 to open the deck lid under power. Closure of contacts 161, 163 energizes the circuit in the same manner as that which results from closing contacts 109, 110 and 111 of switch 15 to close the deck lid under power. In the event that the key is used to unlatch the latch, the lock solenoid 43 serves no useful purpose, since the cam 167 acting upon member 168 of latch bolt 36 of Fig. 2 will mechanically trip the latch bolt 36 to release the latch.

It should be noted hold open circuits are provided through the coils of each pair of relays such as A and B which include contacts of the opposing pairs of relays such as C and D. For example, assume that switch 14 is closed to open the deck lid. Relay coils 172 and 173 of relays A and B will be energized to close contacts 113, 114, 115 of relay A and contacts 138, 141, 142 of relay B to energize motor winding 144 of motor 27 to raise the deck lid. If switch 14 is released, the coils 172 and 173 of relays A and B will remain energized through contacts 150, 151, 153 of relay D and contacts 113, 114, 115 of relay A. The deck lid operating motor 27 will remain energized to complete the opening motion of the deck lid even though switch 14 is only momentarily closed and is then released. In the event that switch 15 is closed, relay coils C and D will be energized to close contacts 117, 118, 119 of relay C and to close contacts 148, 149, 150 of relay D. Coil 155 of motor 27 will be energized to establish downward motion of the deck lid. In the event that switch 15 is released, relay coils 128 and 129 of relays C and D remain energized through contacts 138, 139, 140 of relay B and contacts 117, 118, 119 of relay C. The operator need not hold switches 14 and 15 in their closed position to complete either the closing movement or opening movement under power. It will also be understood that if desired, the direction of travel of the deck lid may be reversed while moving between its open and closed positions by simply closing either switch 14 or 15 as desired, or through operation of the key latch operated switch 166 to connect conductor 160 to either conductor 164 or conductor 165. However, while the direction of travel of the deck lid may be reversed, the deck lid cannot be stopped in any position other than closed or open since the upward travel and downward travel limit switches 34 and 35 must be opened before either circuit can be deenergized.

The modification shown in Figure 14 is adapted to be utilized in connection with the disclosure of Figure 13 to eliminate the downward travel limit switch 35 of Figure 13 and to provide an additional safety feature. Accordingly only a sufficient amount of Figure 13 is repeated in Figure 14 to illustrate the environment of the modification. Parts similar to those of Figure 13 carry the same reference numerals as those of Figure 13. As shown in Figure 14, conductor 130 is extended to contact conductor 180, the switch 35 of Figure 13 being eliminated from the circuit. By this arrangement, timing switch 38 is utilized to control the closing cycle of the deck lid. With the deck lid closed, the contacts 124—125—126 of timing switch 38 are normally open so that no power may may be transmitted to the deck lid actuator. With the arrangement shown in Figure 14, in the event that the lock releasing means should be closed inadvertently as might happen accidentally in loading the rear compartment, the power will be cut off so that the deck lid cannot operate downwardly under power onto the latch until the lock releasing mechanism has first been actuated. Thus, an added safety feature is provided to prevent unintentional or accidental downward movement of the deck lid under power even though the lock releasing mechanism may have been accidentally closed in placing cargo in the rear compartment.

Although the power operated closure member has been illustrated as being a deck lid or trunk closure member, it will be evident that the closure member need not be so limited and that it could constitute any desired vehicle closure member such as, for example, an engine hood or vehicle door.

From the foregoing, it will be apparent that there has been provided a deck lid closure operating mechanism adapted to be controlled from either within the vehicle or from the exterior of the vehicle in either direction under power operation. In addition manual operation may be had from the exterior of the vehicle, and under such operation, the power motor for accomplishing the major travel of the closure member is de-clutched to accommodate manual movement of the deck lid. It will be understood that various changes and modifications may be made without departing from the spirit and scope of the invention as set forth in the appended claims.

We claim:

1. In a vehicle having a body member with a closure member hinged thereon, a power operated extendible and retractable striker member for providing limited movement of said closure member from its closed position to an initial partially open position, a latch bolt movable between latched and unlatched positions, a control system including a control member operable from within said vehicle for releasing said latch bolt and for energizing said striker member to move said closure member to its initial partially open position, and power operated mechanism controlled by said control member for moving said closure member between its initial partially open position and its fully open position.

2. In a vehicle having a body member with a closure member hinged thereon, a power operated extendible and retractable striker member for providing limited movement of said closure member between its closed position and an initial partially open position, a latch bolt movable between latched and unlatched positions, a control system including a control member operable from within the vehicle for releasing said latch bolt and for energizing said striker member to move said closure member to its initial partially open position, power operated mechanism controlled by said control member for moving said closure member between its initial partially open position and its fully open position, and means operable in the fully closed position of said closure member to render said last-mentioned power operated mechanism inoperative when said latch bolt is in its latched position.

3. In a vehicle having a body member with a closure member hinged thereto, an electrically power operated extendible and retractable striker member for providing limited movement of said closure member between its closed position and an initial partially open position, a latch bolt movable between latched and unlatched positions, electrically operable latch bolt operating means for moving said latch bolt from a latched to an unlatched position, an electrical control system including switch means operable from within said vehicle to control said electrically operated latch bolt operating means to release said latch bolt and to energize said striker mechanism to position said closure member in said initially partially open position, and an additional electrical power operated mechanism controllable by said switch means for completing the opening movement of said closure member to its fully open position.

4. In a vehicle having a body member with a closure member hinged thereto, an electrically power operated extendible and retractable striker member for providing limited movement of said closure member between its fully closed position and an initial partially open position, a latch bolt movable between latched and unlatched positions, electrically operable latch bolt releasing means for moving said latch bolt from said latched to said unlatched position, a control system including switch means operable from said vehicle to control said latch bolt releasing means and said striker mechanism to release said latch bolt and to move said striker mechanism to position said closure member in said partially open position, additional electrically power operated mechanism controlled by said switch means for completing the opening movement of said closure member to its fully open position, an additional switch effective in the latched position of said latch bolt to render said last-mentioned power operated mechanism inoperable irrespective of the position of said first-mentioned switch means.

5. In a vehicle having a body with a closure member hinged thereto and having an electrically controlled power operated extendible and retractable striker member for providing limited movement of said closure member from a fully closed to an initial partially open position, a latch bolt movable between latched and unlatched positions, electrically controlled latch bolt releasing means for moving said latch bolt to its unlatched position, a control system including switch means operable from within said vehicle for actuating said latch bolt releasing means and for energizing said power operated striker mechanism to provide initial movement of said closure member to its partially open position, additional electrically power operated mechanism controlled by said switch means for completing the opening movement of said closure member to a fully open position, second switch means effective in the latched position of said latch bolt to render last-mentioned power operated mechanism inoperable irrespective of the position of said first mentioned switch means when said latch bolt is in its latched position and effective in the released position of said latch bolt to render said last mentioned power operated means subject to control by said first mentioned switch means, said first mentioned switch means being effective in one position thereof to energize said last-mentioned power operated means to move said closure member from its open position to said initial partially open position, said striker member being effective upon contact with said latch bolt to move said closure member from said partially open position to its fully closed position.

6. In a vehicle having a body member with a closure member hinged thereto and having an electrically controlled power operated extendible and retractable striker member for providing limited movement of said closure member from its closed position to an initial partially open position, a latch bolt member movable between latched and unlatched positions, electrically controlled latch bolt releasing means for moving said latch bolt to its released position, a control system including switch means operable from within said vehicle, said switch means being effective in one position thereof to energize said latch bolt releasing means to release said latch and to energize said power operated striker to move said closure member to said initial partially open position, a second power operated mechanism for moving said closure member from said initial partially open position to a fully open position, said switch means being effective when said closure member is in its initial partially open position to energize said second power operated mechanism to complete the opening movement of said closure member, said switch means being operable to energize said second power operated mechanism to move said closure member from a fully open position to said initial partially open position and to thereafter energize said power operated striker member to complete the closing action of said closure member, additional means operable from the exterior of said vehicle for releasing said latch bolt, and additional switch means operable from the exterior of said vehicle for controlling said power operated striker member and said second-mentioned power operated mechanism to provide opening and closing of said closure member under power.

7. In a vehicle having a body member with a closure member hinged thereto, power operated mechanism operable to open and close said closure member including a motor and drive mechanism driven by said motor including a clutch, a control circuit for controlling said motor and said clutch to provide opening and closing motion of said closure member under power including first switch means operable from within said vehicle and second switch means operable from the exterior of said vehicle, said first and second switch means being selectively operable to change the direction of movement of said closure member under power at any point in its path of travel, said clutch being normally released and electrically engaged to permit manual opening and closing of said closure member in the event of power failure.

8. In a vehicle having a body member with a closure member hinged thereto, power operated mechanism operable to open and close said closure member including a motor for driving said opening and closing mechanism, a clutch in the drive train adapted to connect said motor to and disconnect said motor from said opening and closing mechanism, means yieldably urging said clutch to disconnect said motor from said opening and closing mechanism, electrically controlled means for engaging said clutch, a control circuit for controlling said motor and said clutch to provide opening and closing motion of said closure member under power, said control circuit including switch means selectively operable to provide either opening motion or closing motion of said closure member under power as desired, said switch means being selectively operable during movement of said closure member under power to reverse the direction of movement of said closure member at any point in its path of travel, said clutch being effective to break the drive between the said motor and said opening and closing mechanism to permit manual opening and closing of said closure member in the event of power failure.

9. In a vehicle having a body member with a closure member hinged thereto, power operated mechanism operable to open and close said closure member including a motor for driving said opening and closing mechanism, a clutch in the drive train adapted to connect said motor to and disconnect said motor from said opening and closing mechanism, means yieldably urging said clutch to disconnect said motor from said opening and closing mechanism, electrically controlled means for engaging said clutch, a control circuit for controlling said motor and said clutch to provide motion of said closure member under power, said control circuit including first switch means selectively operable from within the vehicle to provide either opening motion or closing motion of said closure member under power as desired and second switch means operable from the exterior of the vehicle for providing either opening or closing motion of said closure member under power as desired, said first and second switch means being selectively operable during movement of said closure member under power to reverse the direction of movement of said closure member at any point in its path of travel, said clutch being effective to break the drive between said motor and said opening and closing mechanism to permit manual opening and closing of said closure member in the event of power failure.

10. In a vehicle having a body member with a closure member hinged thereto, power operated mechanism operable to open and close said closure member, a motor for driving said power operated mechanism, a clutch for connecting said motor to and disconnecting said motor from said power operated mechanism, said clutch including a rotatable drum having a clutch actuating plate and a clutch energizing plate disposed therein, said clutch energizing plate being driven by said motor, a reaction plate carried by said rotatable drum, ball ramps formed on the adjacent surfaces of said clutch actuating plate and said clutch energizing plate, respectively, clutch energizing balls disposed in said ramps, means yieldably urging said energizing plate and said clutch actuating plate out of contact with said rotatable clutch drum, and electrically controlled means for urging said clutch actuating plate into contact with said rotatable clutch drum; a control circuit including switch means for controlling said motor and said clutch electrically controlled means to provide selected opening and closing motion of said closure member under power, said clutch being normally released to permit manual opening and closing of said closure member when desired.

11. The combination set forth in claim 10 wherein said switch means is operable from within the vehicle and including second switch means operable from the exterior of the vehicle to permit power operation of said closure member either from within or from without the vehicle.

12. In a vehicle having a body member with a closure member hinged thereto, power operated mechanism operable to open and close said closure member, a motor for driving said power operated mechanism, a clutch for connecting said motor to and disconnecting said motor from said power operated mechanism, said clutch including a rotatable drum having a clutch actuating plate and a motor driven clutch energizing plate disposed therein, a reaction plate carried by said drum, said clutch actuating plate and said clutch energizing plate having adjacent surfaces having ball ramps formed thereon, clutch energizing balls disposed in said ramps, means yieldably urging said clutch energizing plate and said clutch actuating plate out of contact with said rotatable clutch drum and urging said ball ramps into alignment with each other, a shaft extending through said clutch plates and movable in an axial direction with respect to the axis of rotation of said clutch drum for urging said clutch actuating plate into contact with said rotatable clutch drum, electrically controlled means operable to move said shaft to engage said clutch actuating plate to said rotatable clutch drum, a control circuit including switch means for energizing said motor and said electrically controlled means to provide selected opening and closing motion of said closure member under power, said clutch being normally released to permit manual opening and closing of said closure member when desired.

13. The combination set forth in claim 12 wherein said switch means is operable from within said vehicle and including additional switch means operable from the exterior of said vehicle for controlling said motor and said electrically controlled means for engaging said clutch.

14. In a vehicle having a body member with a closure member hinged thereto, power operated linkage mechanism operable to open and close said closure member, a motor for driving said linkage mechanism, clutch means for connecting said motor to and disconnecting said motor from said linkage mechanism, said clutch including a fixed housing having a rotatable clutch drum disposed therein, a clutch actuating plate and a clutch energizing plate disposed within said clutch drum, a reaction plate fixed to said rotatable clutch drum, said clutch actuating plate and said clutch energizing plate having adjacent surfaces having ball ramps formed thereon, clutch energizing balls disposed in said ramps, spring means comprising a torsion and tension spring yieldably urging said clutch actuating plate and said clutch energizing plate out of contact with said clutch drum and for positioning said ball ramps in alignment with each other, a shaft extending through said fixed housing and said clutch plates and movable in an axial direction with respect to the axis of rotation of said rotatable clutch drum for urging said clutch actuating plate into contact with said rotatable clutch drum, solenoid operated means operable to move said shaft to engage said clutch actuating plate with said clutch drum, a control circuit including switch means for energizing said solenoid and said motor to provide selected opening and closing motion of said closure member under power, said clutch being normally released to permit manual opening and closing of said closure member when desired.

15. The combination set forth in claim 14 including an annular grease seal member disposed between said clutch reaction plate and said fixed housing.

16. In a vehicle having a body member with a closure member hinged thereto, power operated mechanism operable to open and close said closure member including drive mechanism having a clutch therein, said clutch including a rotatable clutch drum having a clutch actuating plate and a power driven clutch energizing plate disposed therein, a reaction plate carried by said drum, ball ramps formed on the adjacent surfaces of said clutch actuating plate and said clutch energizing plate, respectively, clutch energizing balls disposed in said ramps, means yieldably urging said energizing plate and said clutch actuating plate out of contact with said rotatable clutch drum, and a control circuit for controlling the power operated mechanism and said clutch to selectively provide opening and closing motion of said closure member.

17. In a vehicle having a body member with a closure member hinged thereto, power operated mechanism operable to open and close said closure member including a motor and drive mechanism driven by said motor including a clutch, said clutch including a rotatable clutch drum having a clutch actuating plate and a clutch energizing plate disposed therein, said clutch energizing plate being driven by said motor, a reaction plate carried by said clutch drum, ball ramps formed on the adjacent surfaces of said clutch actuating plate and said clutch energizing plate, respectively, clutch energizing balls disposed in said ramps, means yieldably urging said energizing plate and said clutch actuating plate out of contact with said rotatable clutch drum, and a control circuit for controlling said motor and said clutch to provide opening and closing motion of said closure member under power including first switch means operable from within said vehicle and second switch means operable from the exterior of said vehicle, said clutch being normally released and electrically engaged to permit manual opening and closing of said closure member in the event of power failure.

References Cited in the file of this patent

UNITED STATES PATENTS

| | | |
|---|---|---|
| 2,591,693 | Gatesy | Apr. 8, 1952 |
| 2,594,643 | Gustisha | Apr. 29, 1952 |